United States Patent [19]

Itatani et al.

[11] Patent Number: 4,568,715

[45] Date of Patent: Feb. 4, 1986

[54] AROMATIC POLYIMIDE COMPOSITION COMPRISING MIXED SOLVENT

[75] Inventors: Hiroshi Itatani; Toshihiro Inaike; Shuji Yamamoto, all of Ichihara, Japan

[73] Assignee: Ube Industries, Ltd., Yamaguchi, Japan

[21] Appl. No.: 714,008

[22] Filed: Mar. 20, 1985

[30] Foreign Application Priority Data

Mar. 21, 1984 [JP] Japan ................................. 59-52204

[51] Int. Cl.$^4$ ............................................. C08L 79/08
[52] U.S. Cl. ..................................... 524/348; 524/323; 524/324; 524/342; 524/343; 524/346; 528/128; 528/172; 528/183; 528/188; 528/189
[58] Field of Search ............... 524/348, 323, 324, 342, 524/343, 346; 528/183, 188, 189, 128, 172

[56] References Cited

U.S. PATENT DOCUMENTS 3,759,913  9/1973  Blackley ............................. 528/348
4,290,936  9/1981  Sasaki et al. .

*Primary Examiner*—Harold D. Anderson
*Attorney, Agent, or Firm*—Burgess, Ryan & Wayne

[57] ABSTRACT

An aromatic polyimide composition usable for producing shaped articles, for example, films, or as varnish, lacquer, or bonding agent, comprises a high molecular weight aromatic polyimide resin which is a polycondensation-imidization product of an aromatic tetracarboxylic acid component comprising 50 molar % or more of 3,4,3',4'-biphenyltetracarboxylic acid, anhydride, salt, or ester with an aromatic diamine component including 50 molar % or more of 4,4'-diaminodiphenylether, and which is dissolved in a mixed solvent consisting essentially of 10% by weight or more of a first solvent component selected from naphthol and resorcin and the balance of a second solvent component selected from phenol and cresols.

8 Claims, No Drawings matic polyimide resin which is a polycondensation-imidization product of an aromatic tetracarboxylic acid component comprising, as a main acid ingredient, at least one member selected from the group consisting of 3,4,3',4'-biphenyltetracarboxylic acid and anhydride, salts, and esters thereof with an aromatic diamine component comprising, as a main amine ingredient, 4,4'-diaminodiphenylether; and (2) a mixed solvent consisting essentially of 10% by weight or more of a first solvent component consisting of at least one member selected from the group consisting of naphthols and, resorcine and the balance of a second solvent component consisting of at least one member selected from the group consisting of phenol and cresols, the aromatic polyimide resin being dissolved in the mixed solvent.

DESCRIPTION OF THE PREFERRED EMBODIMENTS

In the aromatic polyimide composition, an aromatic polyimide resin is dissolved in a mixed solvent.

The aromatic polyimide resin is a polycondensation-imidization product of an aromatic tetracarboxylic acid component with an aromatic diamine component.

The aromatic tetracarboxylic acid component comprises, as a main acid ingredient, at least one member selected from 3,4,3',4'-biphenyltetracarboxylic acid and anhydride, salts, and esters thereof. In the aromatic tetracarboxylic acid component, 3,4,3',4'-biphenyltetracarboxylic acid or its functional derivative is contained preferably in an amount of 50 to 100 molar %, more preferably, 80 to 100 molar %. The aromatic tetracarboxylic acid component may contain, in addition to the main acid ingredient, an additional acid ingredient consisting essentially of at least one member selected from the group consisting of pyromellitic acid, 2,3,6,7-naphthalenetetracarboxylic acid, 2,3,3',4'-biphenyltetracarboxylic acid, 3,4,3',4'-benzophenonetetracarboxylic acid, 2,2'-bis(3,4-dicarboxyphenyl)propane, bis(3,4-dicarboxyphenyl)sulfone, bis(3,4-dicarboxyphenyl)ether and anhydrides, salts, and esters of the above-mentioned compounds, in an amount of 50 molar % or less, preferably 20 molar % or less.

The aromatic diamine component comprises 4,4'-diaminodiphenylether. That is, the content of 4,4'-diaminodiphenylether in the aromatic diamine component is preferably 40 to 100 molar %, more preferably 50 to 100 molar %, still more preferably 70 to 100 molar %.

The aromatic diamine component may contain, in addition to the 4,4'-diaminodiphenylether, an additional amine ingredient consisting essentially of at least one member selected from the group consisting of 4,4'-diamine-3,3'-dimethylbiphenyl, 4,4'-diaminodiphenylthioether, 4,4'-diaminodiphenylmethane, 4,4'-diamino-3,3'-dimethyldiphenylether, 1,4-phenylenediamine, 1,3-phenylenediamine, 4,4'-diaminoazobenzene, 4,4'-diaminodiphenylsulfone, and 4,4'-diaminobenzophenone, in an amount of 40 molar % or less, preferably, 50 molar % or less, still more preferably 30 molar % or less.

In an example of the process for producing the aromatic polyimide resin, the aromatic tetracarboxylic acid component is polycondensed with the aromatic diamine component and then the resultant product (polyamic acid) is imidized to the corresponding polyimide.

In another example of the process for producing the aromatic polyimide resin, the polycondensation of the aromatic tetracarboxylic acid component with the aromatic diamine component and the imidization of the polycondensation product are carried out in a single-step procedure in a solvent at a relatively high temperature of, for example, from 90° C. to 200° C. In the single-step procedure, it is preferable that the solvent be of the same type as the mixed solvent to be used in the polyimide composition of the present invention.

In the single-step procedure, water produced, as a by-product, in the polycondensation and imidization reactions may be dispersed in the resultant solution or may be removed together with a portion of the solvent from the resultant solution by means of azeotropic distillation.

The aromatic polyimide resin usable for the present invention has a high molecular weight corresponding to a logarithmic viscosity of 1 to 2, determined in 4-chlorophenol at a concentration of 0.5 g/100 ml at a temperature of 50° C.

The mixed solvent usable for the present invention consists essentially of (1) 10% by weight or more, preferably from 10% to 90% by weight, more preferably from 40% to 80% by weight of a first solvent component consisting of at least one member selected from naphthols and resorcin, and (2) the balance of a second solvent component consisting essentially of at least one member selected from the group consisting of phenol cresols. The naphthols include $\alpha$-naphthol and $\beta$-naphthol, and cresols include o-cresol, m-cresol, and p-cresol.

The specific mixed solvent usable for the present invention is highly effective for dissolving therein the high molecular weight aromatic polyimide resin in a high concentration. The resultant solution (composition) is highly useful for producing shaped articles having excellent mechanical and electrical properties.

In the preparation of the aromatic polyimide composition, the aromatic polyimide resin powder is mixed with and dissolved in the mixed solvent at a temperature of 90° C. to 200° C. Otherwise, the aromatic tetracarboxylic acid component and the aromatic diamine component are dissolved in substantially equimolar amounts in the same mixed solvent as that of the aromatic polyimide composition of the present invention and are polycondensed and imidized at a temperature of 90° C. to 200° C., while the solution is stirred.

In the resultant aromatic polyimide composition, the aromatic polyimide resin is preferably in a concentration of from 2% to 20% by weight, more preferably, from 5% to 15% by weight. Also, it is preferable that the aromatic polyimide composition exhibit a rotation viscosity of from 1 to 200,000 poises, more preferably from 1 to 500 poises.

The aromatic polyimide composition exhibits a high stability over a long period of storage.

Therefore, even after the aromatic polyimide composition is stored at a temperature of 100° C. for 15 hours, the rotation viscosity of the aromatic polyimide composition is maintained at the same level as the initial level.

The aromatic polyimide composition can be used for producing shaped articles or coatings. In the composition, the resin to be dissolved is in the state of a substantially completely imidized resin. Therefore, in the shaped article or coating-producing procedure, no water is produced. Accordingly, the aromatic polyimide composition exhibits an excellent shaping (molding or coating) property, and the resultant shaped articles or coatings have a smooth surface.

AROMATIC POLYIMIDE COMPOSITION COMPRISING MIXED SOLVENT

BACKGROUND OF THE INVENTION (1) Field of the Invention

The present invention relates to an aromatic polyimide composition. More particularly, the present invention relates to an aromatic polyimide composition in which a high molecular weight aromatic polyimide prepared from an acid component comprising as a main acid ingredient, 3,4,3',4'-biphenyltetracarboxylic acid and an amine component comprising, as a main amine ingredient, 4,4'-diaminodiphenylether is dissolved in a naphthol or resorcin type mixed solvent, and which exhibits an excellent long storage stability and is useful for producing shaped articles having excellent mechanical properties and electrical properties.

(2) Description of the Related Art

It is known that an aromatic polyimide is produced by a two-step process. In the process, an aromatic tetracarboxylic acid component is polycondensed with an aromatic diamine component in an organic polar solvent at a relatively low temperature of, for example, 30° C. or less, to provide a polyamic acid dissolved in the organic polar solvent, and, then, the polyamic acid is converted to a corresponding aromatic polyimide.

Recently, it has been learned that the aromatic polyimide can be produced in a single-step process wherein a specifically selected aromatic tetracarboxylic acid component and a specifically selected aromatic diamine component are polycondensed and imidized in one step in an organic polar solvent at an relatively high temperature. For example, U.S. Pat. Nos. 3,666,709 and 4,247,443 and Japanese Examined Patent Publication (Kokoku) Nos. 46-17145, 47-23191, 47-26878, and 48-26958 disclose process for producing aromatic polyimide solutions in which an aromatic acid component comprising, as a main acid ingredient, 3,4,3',4'-benzophenonetetracarboxylic dianhydride is reacted with an aromatic diamine component in the same molar amount as that the aromatic acid component, in a phenol solvent at an elevated temperature to polycondense and imidize in a single step.

Also, U.S. Pat. No. 3,988,303 and Japanese Unexamined Patent Publication (Kokai) No. 51-81899 disclose single-step processes for producing an aromatic polyimide solution, in which process an acid component comprising, as a main acid ingredient, 3,4,3',4'-benzophenonetetracarboxylic dianhydride or 1,4,5,8-naphthalenetetracarboxylic dianhydride and an aromatic amine component are polycondensed and imidized in a single step.

Furthermore, Japanese Examined Patent Publication (Kokoku) No. 47-37706 discloses a polyimide resin composition in which an aliphatic tetracarboxylic acid component is used.

When various shaped articles, for example, films, are prepared from the polyimide compositions or solutions as disclosed in the above-mentioned prior art, the resultant products exhibit unsatisfactory mechanical properties, for example, a very poor tensile strength of 10 to 15 kg/mm² in comparison with those of conventional polyimide products (films) produced from polyimide solutions produced by the two-step polycondensation-imidization reaction of a tetracarboxylic acid component, for example, pyromellitic dianhydride with an amine component, for example, 4,4'-diaminodiphenylether.

Japanese Unexamined Patent Publication (Kokai) No. 50-113,597 discloses a process for producing a solvent-soluble aromatic polyimide from 3,4,3',4'-biphenyltetracarboxylic acid or 2,3,3',4'-biphenyltetracarboxylic acid. This aromatic polyimide is dissolved in a phenolic solvent, for example, m-cresol or xylenol, to provide a varnish useful for coating electric wires or cables. However, the resultant coating film exhibits unsatisfactory mechanical properties.

U.S. Pat. No. 4,290,936 discloses a solution of a polyimide composition useful for producing shaped polyimide articles, for example, polyimide films, having excellent mechanical properties. This type of aromatic polyimide composition solution is produced by polycondensing and imidizing an aromatic acid component comprising 80 molar % or more of 3,4,3',4'-biphenyltetracarboxylic acid with an aromatic amine component comprising 70 molar % or more of 4,4'-diaminediphenylether, in a solvent consisting of a halogenated phenolic compound at a temperature of 100° C. to 300° C. According to Example 2 of U.S. Pat. No. 4,290,936, the resultant polyimide film produced from a polyimide solution having a logarithmic viscosity of 2.38 exhibits an excellent tensile strength of 21.4 kg/mm² and an ultimate elongation of 98.0%. However, the polyimide films or other shaped articles produced from a solution of the polyimide in a solvent containing a halogenated phenolic compound, for example, 4-chlorophenol, 4-bromophenol, or 4-fluorophenol, contain a small amount of the halogen compounds even after the solvent is removed from the films or the other articles at an elevated temperature. In certain uses of the aromatic polyimide composition, for example, high precision electric circuit boards in electronic devices, the halogen compounds are strictly prohibited, because they cause the electrical properties of the electronic devices to be degraded. Also, m-nitrophenol and catechol are usable as solvents for dissolving therein 5% by weight of a high molecular weight aromatic polyimide resin. However, when the m-nitrophenol is used, the cost of the resultant composition becomes undesirably high, because of the high price of m-nitrophenol and the difficult the removal and recovery of m-nitrophenol from the resultant shaped product by means of distillation. Also, when catechol is used, the resultant shaped products exhibit unsatisfactory mechanical and electrical properties, because of the easy decomposition of catechol.

It is strongly desired in the industry to obtain an aromatic polyimide composition which is completely free from the above-mentioned disadvantages.

SUMMARY OF THE INVENTION

An object of the present invention is to provide an aromatic polyimide composition useful for producing shaped articles having not only excellent mechanical properties but also excellent electrical properties.

Another object of the present invention is to provide an aromatic polyimide composition highly stable over a long period of storage.

Still another object of the present invention is to provide an aromatic polyimide composition useful as a varnish, lacquer, and bonding agent.

The above-mentioned objects can be attained by the aromatic polyimide composition of the present invention, which comprises (1) a high molecular weight aro- The aromatic polyimide composition can be converted to shaped articles, for example, films or sheet, by a spreading method or can be used as coating varnish for coating electroconductive materials, for example, electric wires or cables, as paints, or as bonding agents.

The aromatic polyimide composition of the present invention is especially highly effective for forming outer surface layers or inside surface layers of heating vessels which should be highly heat resistant.

In the aromatic polyimide composition of the present invention, the specific high molecular weight aromatic polyimide resin prepared mainly from a 3,4,3′,4′-biphenyltetracarboxylic acid-containing acid component and a 4,4′-diaminodiphenylether-containing amine component uses the resultant shaped articles or coatings to exhibit excellent mechanical properties (tensile strength). Also, in the aromatic polyimide composition of the present invention, the specific mixed solvent, which is free from halogen compounds, nitrocompounds, and catechol compounds, causes the resultant shaped articles or coatings to exhibit satisfactory electrical properties. Also, the removal and recovery of the mixed solvent can be easily carried out with a low consumption of energy.

The present invention will be further explained by way of specific examples, which, however, are representative and do not restrict the scope of the present invention in any way.

EXAMPLE 1

In a cylinder-type polymerization vessel having a capacity of 14 l, 540 g of 3,4,3′,4′-biphenyltetracarboxylic dianhydride (referred to as s-BPDA hereinafter) were mixed with 360 g of 4,4′-diaminodiphenylether (referred to as DADE hereinafter) and 6.6 l of N-methyl-2-pyrrolidone. The resultant mixture was stirred at room temperature (about 25° C.) for 6 hours to polycondense s-BPPA with DADE. The resultant polycondensation solution contained about 12% by weight of a polyamic acid and had a rotation viscosity of about 6,000 centipoises. The resultant polyamic acid had a logarithmic viscosity of 2.8.

A three-necked flask provided with a stirrer, a thermometer, and a reflux condenser equipped with a container for receiving water was charged with 2 kg of the polyamic acid-containing solution and, then, charged dropwise with 100 ml of triethylamine. The reaction mixture was gradually heated to a temperature of from 140° C. to 200° C. over a time period of about 3 hours, while causing water to be generated and removing the water from the reaction system. The resultant reaction mixture contained yellow precipitates consisting of resultant aromatic polyimide resin. The precipitates, in the form of grain type crystals, were removed from the reaction mixture by means of filtration, washed with methyl alcohol and then with acetone, and finally dried at 100° C. The resultant aromatic polyimide resin had a logarithmic viscosity of 1.18 and a degree of imidization of 95% or more and was composed of fine crystals having a size of about 2 microns agglomerated together.

A solution was prepared by dissolving 15.0 g of the polyimide resin in 85.0 g of a mixed solvent consisting of resorcin and phenol in a weight ratio of 50:50 on an oil-bath at a temperature of 110° C. for one hour.

The resultant aromatic polyimide solution contained 15% by weight of the aromatic polyimide resin and had a rotation viscosity of 100 poises.

The aromatic polyimide solution was spread on a horizontal glass plate to form a thin layer of 0.018 g/cm$^2$ The resultant thin layer of the aromatic polyimide solution was heated at a temperature of 170° C. for one hour, at a temperature of 220° C. for one hour, and then at a temperature of 300° C. for one hour, while blowing air so as to evaporate the mixed solvent. The resultant thin film of the aromatic polyimide resin had a thickness of 25 microns and an orange color. The film was subjected to a tensile strength test at a temperature of 25° C. in accordance with ASTM D882-64T. As a result, the film exhibited a tensile strength of 21.5 kg/mm$^2$ and an ultimate elongation of 85%.

EXAMPLE 2

A flash having a capacity of 300 ml was charged with 10.8 g of s-BPDA, 7.2 g of DADE, and a mixed solvent consisting of 82 g of resorcin and 82 g of phenol and placed on a heating oil bath. The reaction mixture was heated to a temperature of 170° C. and stirred at 170° C. The viscosity of the reaction mixture increased with the lapse of time. That is, the molecular weight of the resultant aromatic polyimide resin in the reaction mixture increased with the lapse of the reaction time.

The rotation viscosity of the reaction mixture containing about 11% by weight of the polyimide resin in the mixed solvent of resorcin and phenol in a weight ratio of 50:50 was 100 poises (at 100° C.) after 5 hours' stirring at 170° C. and 250 poises (at 100° C.) after 15 hours' stirring at 170° C. That is, the increase in the rotation viscosity of the aromatic polyimide solution with the lapse of time was small.

EXAMPLE 3

The same procedures as those described in Example 2 were carried out, except that the mixed solvent consisted of 60 g of resorcin and 60 g of phenol. The rotation viscosity of the reaction mixture containing about 15% by weight of the resultant polyimide resin in the mixed solvent was 1000 poises (at 100° C.) after 5 hours' stirring at 170° C. and 8000 poises (at 100° C.) after 15 hours' stirring at 170° C. That is, the change in the viscosity of the polyimide solution or in the molecular weight of the polyimide resin with the lapse of time was small, whereas a solution of a polyimide in chlorophenol solvent exhibited a significantly large increase in rotation viscosity thereof with the lapse of time.

That is, the polyimide solution of the present invention exhibited an excellent heat and storage stability.

The 15% by weight solution of the polyimide resin which had been stirred for 15 hours at 170° C. was used to prepare a thin film having a thickness of 25 microns in the same manner as that described in Example 1.

The resultant thin film exhibited a tensile strength of 20.5 kg/mm$^2$ and an ultimate elongation of 82% at about 25° C.

EXAMPLE 4

The same procedures as those described in Example 2 were carried out, except that 82 g of resorcin was replaced by 82 g of α-naphthol.

The rotation viscosity of the reaction mixture containing about 11% by weight of a polyimide increased at 170° C. to 25 poises (at 100° C.) after 5 hours' stirring and to 100 poises (at 100° C.) after 15 hours' stirring.

EXAMPLE 5

The same procedures as those described in Example 3 were carried out, except that 60 g of resorcin was replaced by 60 g of α-naphthol.

The rotation viscosity of the reaction mixture containing about 15% by weight of a polyimide increased at 170° C. to 100 poises at 100° C. after 5 hours' stirring and 9000 poises (at 100° C.) after 15 hours' stirring.

The resultant polyimide solution having a rotation viscosity of 9000 poises at 100° C. was spread on a horizontal glass plate and dried in an air oven at a temperature of 300° C. for one hour. The resultant thin film had a thickness of 15 microns and a dark brown color and exhibited a tensile strength of 19.2 kg/mm$^2$, an ultimate elongation of 83%, and a modulus of elasticity in tension of 298 kg/mm$^2$.

EXAMPLE 6

A reaction mixture consisting of 6.62 g of s-BPDA, 0.55 g of pyromellitic dianhydride (referred to as PMDA hereinafter), 5.0 g of DADE, and a mixed solvent consisting of 55 g of phenol and 55 g of resorcin, was heated at 170° C. for 5 hours while the mixture was stirred.

A homogeneous polyimide solution containing 10% by weight of a polyimide resin and having a rotation viscosity of 120 poises at 100° C. was obtained.

EXAMPLE 7

A reaction mixture consisting of 7.35 g of s-BPDA, 4.50 g of DADE, 5.00 g of 4,4'-diamino-diphenylmethane, and a mixed solvent consisting of 56 g of resorcin and 56 g of phenol was heated on an oil bath at a temperature of 170° C. for 5 hours. A homogeneous polyimide solution containing 10% by weight of the resultant polyimide resin and having a rotation viscosity of 80 poises at 100° C. was obtained.

EXAMPLE 8

The same procedures as those described in Example 2 were carried out, except that phenol was replaced by m-cresol. The rotation viscosity of the reaction mixture containing about 11% by weight of the resultant polyimide increased at 170° C. to 150 poises (at 100° C.) after 5 hours' stirring and to 330 poises (at 100° C.) after 15 hours' stirring.

The resultant polyimide solution having a 330 poise rotation viscosity was spread on a glass plate and dried in an air oven at a temperature of 100° C. for one hour. The resultant thin film had a thickness of 20 microns and an orange color and exhibited a tensile strength of 23 0 kg/mm$^2$ and an ultimate elongation of 88%.

EXAMPLE 9

The same procedures as those described in Example 4 were carried out, except that phenol was replaced by m-cresol.

The rotation viscosity of the reaction mixture containing about 11% by weight of the resultant polyimide resin increased at 170° C. to 30 poises (at 100° C.) after 5 hours' stirring and to 120 poises (at 100° C.) after 15 hours' stirring.

The resultant polyimide solution having a rotation viscosity of 120 poises was converted to a thin film in the same manner as that described in Example 8.

The resultant thin film had a thickness of 23 microns and a dark brown color and exhibited a tensile strength of 19.5 kg/mm$^2$ and an ultimate elongation of 83%.

EXAMPLE 10

A coating varnish consisting of the same polyimide solution as that described in Example 2 was applied to an annealed copper wire having a diameter of 1.0 mm and heated at a temperature of 100° C. for 30 minutes and then, at a temperature of 200° C. for 30 minutes, to form a coating layer having a thickness of 50 microns on the copper wire.

The resultant insulated copper wire exhibited a dielectric breakdown voltage of 13 KV, an abrasion resistance of 100 times or more under a load of 700 g, a heat-softening temperature of 500° C. or more, and an excellent resistance to styrene monomer at a temperature of 120° C.

EXAMPLE 11

The same procedures as those described in Example 10 were carried out, except that the polyimide solution used was the same as that described in Example 4.

The resultant insulated copper wire exhibited a dielectric breakdown voltage of 13 KV, an abrasion resistance of 100 times or more under a load of 700 g, a heat-softening temperature of 500° C. or more, and an excellent styrene monomer resistance.

We claim:

1. An aromatic polyimide composition comprising:
   (1) A high molecular weight aromatic polyimide resin which is a polycondensation-imidization product of an aromatic tetracarboxylic acid component comprising, as a main acid ingredient, at least one member selected from the group consisting of 3,4,3',4'-biphenyltetracarboxylic acid and anhydride, salts, and esters thereof with an aromatic diamine component comprising, 4,4'diaminodiphenylether and,
   (2) a mixed solvent consisting essentially of 10% by weight or more of a first solvent component consisting of at least one member selected from the group consisting of naphthols and resorcin, and the balance of a second solvent component consisting of at least one member selected from the group consisting of phenol and cresols, said aromatic polyimide resin being dissolved in said mixed solvent.

2. The aromatic polyimide composition as claimed in claim 1, wherein said aromatic polyimide resin has a logarithmic viscosity of 0.5 to 4, determined in 4-chlorophenol at a concentration of 0.5 g/100 ml at a temperature of 50° C.

3. The aromatic polyimide composition as claimed in claim 1, wherein the main acid ingredient in said aromatic tetracarboxylic acid component is in an amount of 50 to 100 molar %.

4. The aromatic polyimide composition as claimed in claim 1, wherein said aromatic tetracarboxylic acid component contains, in addition to the main acid ingredient, an additional acid ingredient consisting essentially of at least one member selected from the group consisting of pyromellitic acid, 2,3,6,7-naphthalenetetracarboxylic acid, 2,3,3',4'-biphenyltetracarboxylic acid, 3,4,3',4'-benzophenonetetracarboxylic acid, 2,2'-bis(3,4-dicarboxyphenyl)propane, bis(3,4-dicarboxyphenyl)sulfone, bis(3,4-dicarboxyphenyl)ether, and anhydrides, salts, and ethers of the above-mentioned compounds, in an amount of 50 molar % or less.

5. The aromatic polyimide composition as claimed in claim 1, wherein 4,4'-diaminodiphenylether in said aromatic diamine component is in an amount of 40 to 100 molar %.

6. The aromatic polyimide composition as claimed in claim 1, wherein said aromatic diamine component contains, in addition to the 4,4'-diphenyldiphenylether, an additional amine ingredient consisting of at least one member selected from the group consisting of 4,4'-diamino-, 3,3'-dimethylbiphenyl, 4,4'-diamino-diphenylthioether, 4,4'-diaminodiphenylmethane, 4,4'diamino-3,3'-dimethyldiphenylether, 1,4-phenylenediamine, 1,3-phenylenediamine, 4,4'-diaminoazobenzene, 4,4'-diaminodiphenylsulfone, and 4,4'-diamino-benzophenone, in an amount of 60 molar % or less.

7. The aromatic polyimide composition as claimed in claim 1, wherein said aromatic polyimide dissolved in said mixed solvent is in an amount from 2% to 20% by weight.

8. A varnish comprising the aromatic polyimide composition as claimed in claim 1.

* * * * *